Figure 1:
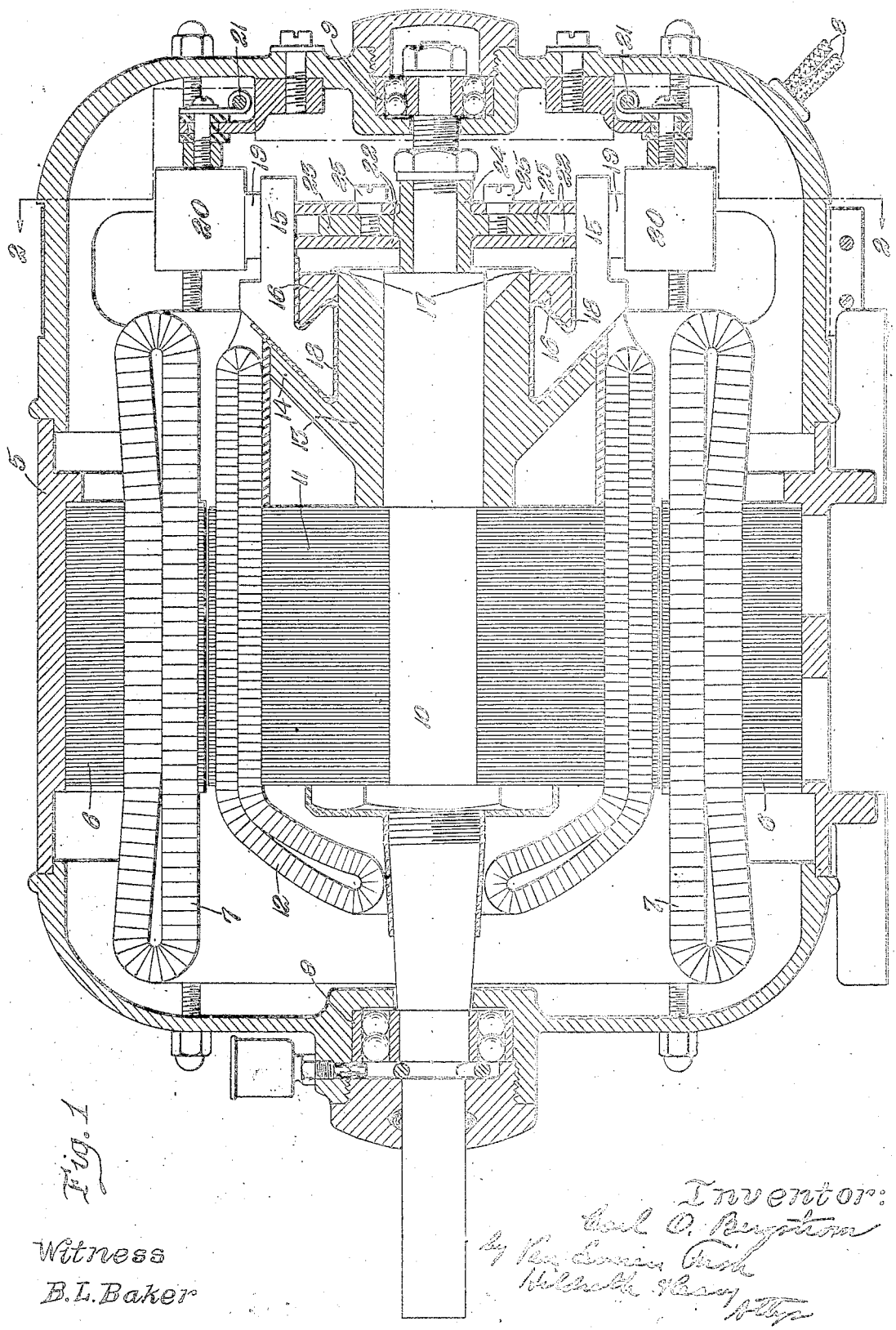

Jan. 5, 1926.    1,568,262
C. O. BERGSTROM
DYNAMO ELECTRIC MACHINE
Filed August 29, 1922    2 Sheets-Sheet 1

Witness
B. L. Baker

Inventor:
Carl O. Bergstrom

Jan. 5, 1926.
C. O. BERGSTROM
1,568,262
DYNAMO ELECTRIC MACHINE
Filed August 29, 1922    2 Sheets-Sheet 2
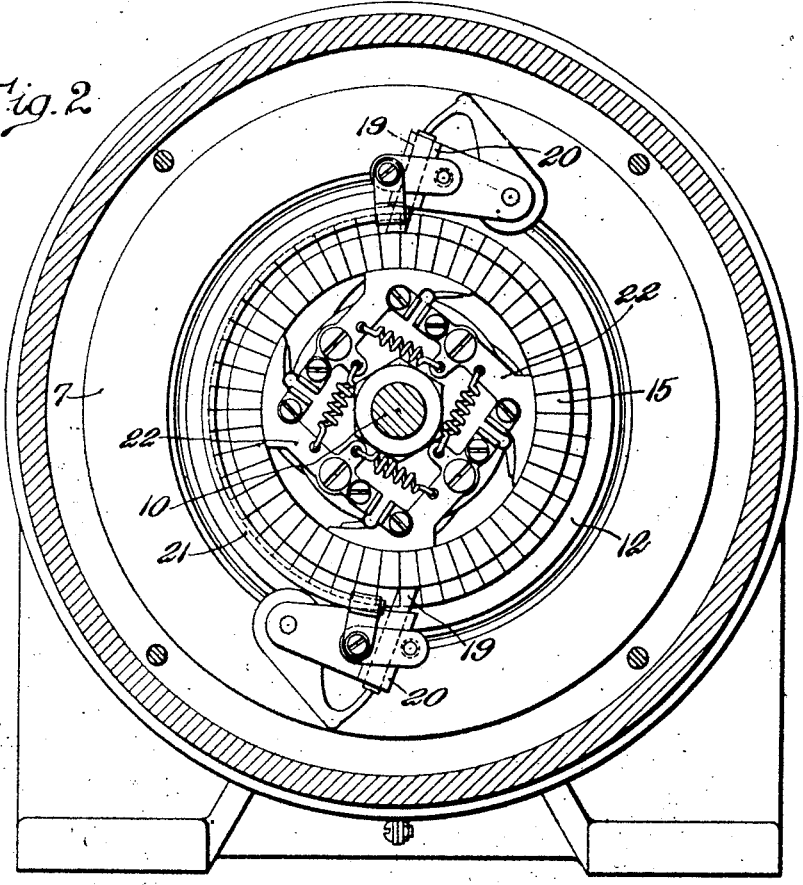
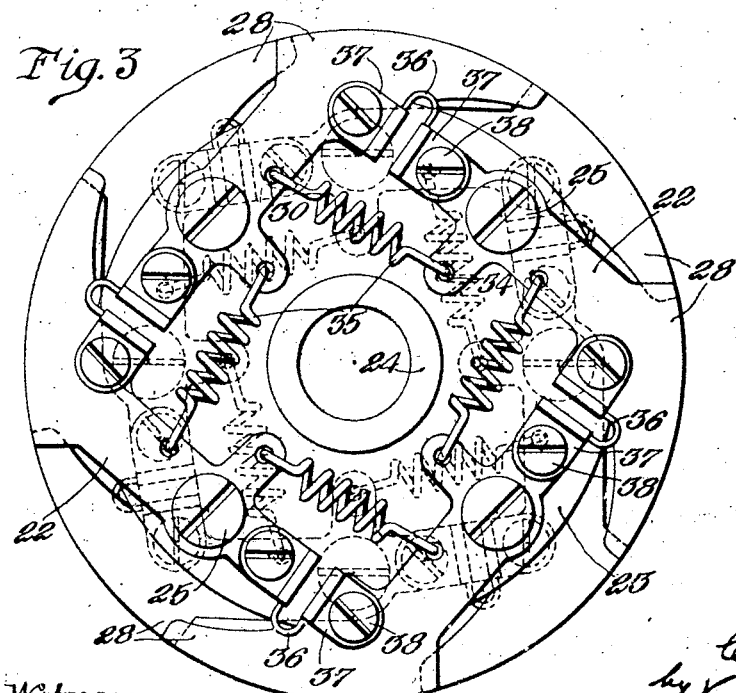
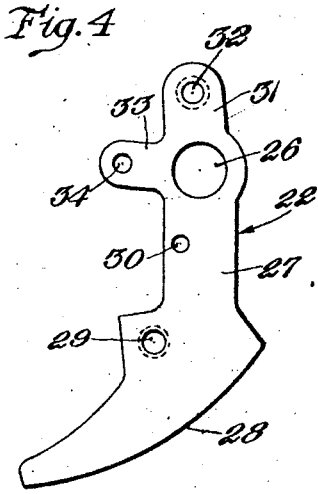

Patented Jan. 5, 1926.

1,568,262

UNITED STATES PATENT OFFICE.

CARL O. BERGSTROM, OF BOSTON, MASSACHUSETTS, ASSIGNOR TO B. F. STURTEVANT COMPANY, OF BOSTON, MASSACHUSETTS, A CORPORATION OF MASSACHUSETTS.

DYNAMO-ELECTRIC MACHINE.

Application filed August 29, 1922. Serial No. 585,005.

*To all whom it may concern:*

Be it known that I, CARL O. BERGSTROM, a citizen of the United States, residing at Boston, in the county of Suffolk and State of Massachusetts, have invented certain new and useful Improvements in Dynamo-Electric Machines; and I do hereby declare the following to be a full, clear, and exact description of the invention, such as will enable others skilled in the art to which it appertains to make and use the same.

The present invention relates to dynamo electric machines, and more particularly to machines comprising a rotor having windings and a commutator the bars of which are arranged to be short-circuited during the operation of the machine.

A machine of this type is the repulsion-induction motor which is a self-starting, single phase, alternating current motor. This motor starts as a repulsion-motor with the brushes short-circuited, and after the predetermined speed is reached the commutator bars are short-circuited, whereupon the motor operates as a single-phase induction motor of the squirrel-cage type.

The object of the present invention is to provide a simple, compact, and reliable mechanism for short-circuiting the commutator of dynamo electric machines and particularly of such repulsion-induction motors.

To the above end the present invention consists of the devices and combinations of devices hereinafter described and more particularly defined in the claims.

In the accompanying drawings which illustrate what is now considered the preferred embodiment of the present invention, Fig. 1 is a vertical longitudinal section of a repulsion-induction motor embodying the present invention; Fig. 2 is a vertical transverse section on line 2—2 of Fig. 1, looking in the direction of the arrow; Fig. 3 is an enlarged end elevation of the short-circuiting members and their mounting; and Fig. 4 shows one of the short-circuiting members detached.

The motor, as illustrated in Fig. 1, comprises the usual frame or casing 5, carrying the stator laminations 6 and stator windings 7 to which a single-phase alternating current is supplied through the wires 8. Mounted in ball bearings 9 in the casing 5 is the motor shaft 10 having fixed thereon the rotor laminations 11 and windings 12.

Also fixed upon the rotor shaft is the commutator consisting of the sleeve 13 with the overhanging flange 14, bars 15, and securing rings 16 held in position by the peined-over edge 17 of the sleeve 13. Suitable insulation 18 is provided between the commutator bars and the sleeve and ring. The rotor windings 12 are connected to the commutator bars in the usual manner.

It will be noted that the commutator bars 15 project axially beyond the supporting sleeve 13 and ring 16, thus providing both an external and an internal peripheral contact surface. Brushes 19 carried in the brush holders 20 supported on the casing 5 are arranged to engage the outer periphery of the commutator in the usual manner. These brushes are at all times short-circuited, that is, connected to one another, by means of the connector 21.

The devices for short-circuiting the commutator after the rotor has been set in operation and has reached the predetermined speed consist of centrifugally operated contact members which are thrown outwardly against the internal peripheral surface of the commutator bars. These contact members 22, of which one is shown enlarged in Fig. 4, are pivotally mounted upon the flange 23 of a sleeve 24 fixed upon the rotor shaft. In the illustrated embodiment of the preferred invention eight of these contact members 22 are shown mounted on pivot screws 25 upon the flange of the sleeve, four fingers on each side, in staggered relation.

The contact members, as shown in Fig. 4, are in the form of a three arm lever having a hole 26 for the pivot screw 25. The longer arm 27 is provided with an arc-shaped contact face 28 at its free end and a threaded hole 29 and plain hole 30. The oppositely extending short arm 31 is provided at its extremity with a tapped hole 32. A third arm 33 at right angles to the arms 27 and 31 is provided at its extremity with a hole 34.

As shown in Fig. 3, the contact members are connected one to another by means of springs 35, one end of each spring being secured in the hole 34 in the arm 31 of one contact member, and the other end in the hole 30 in the arm 27 of the next adjacent member. These springs tend to swing the contact members about their pivot screws 25 to hold the contact faces 28 out of engagement with the internal face of the commutator.

Special provision is made to insure good electrical connection between the contact members by means of flexible conductors 36 the ends of which are soldered or otherwise secured to the clips 37 which in turn are attached to the adjacent contact members by means of screws 38 passing through such clips and entering the threaded holes 29 and 32 respectively in adjacent members.

The contact faces 28 of the contact members are preferably formed of a length in excess of 45 degrees, and the members being mounted in staggered relation upon the flanges 23 of the sleeve 24, the contact faces of adjacent members overlap at their ends, so that a continuous 360-degree contacting face is provided.

In operation, when the motor is started the springs 35 hold the contact faces 28 of the members 27 out of engagement with the internal peripheral face of the commutator and the brushes being short-circuited through the connector 21, the motor starts itself in operation as a repulsion-motor. As the motor gathers speed the centrifugal force increases until, finally overcoming the tension of springs 35, it turns the contact members 22 upon their pivot screw 25, bringing the contact faces 28 into engagement with the inner face of the commutator, thereby short-circuiting the commutator bars. The motor then operates as an induction motor of the squirrel-cage type.

The above described arrangement for short-circuiting the commutator is simple, compact and efficient. The length of the rotor is not increased and the short-circuiting mechanism is in the form of a unit which may be assembled and adjusted while detached from the rotor. The entire commutator is short-circuited, and by the use of electrical connections between the contact members, all liability of damage to the tension springs through the heating effect of electrical currents passing therethrough is avoided.

Having thus described the present invention, what is claimed is:

1. In a dynamo electric machine the combination of a rotor having windings and a commutator, the commutator being provided with an internal contact face, supporting means carried by the rotor and a plurality of contact members pivotally mounted upon said means to turn about axes substantially parallel to the axis of the rotor, said members being normally held out of contact with the internal face of the commutator and arranged to be thrown by centrifugal action into contact with such face of the commutator when the rotor reaches the predetermined speed.

2. In a dynamo electric machine the combination of a rotor having windings and a commutator, the commutator being provided with an internal contact face, a plurality of movable contact members mounted within the inner periphery of the internal contact face of the commutator and normally out of engagement therewith, means for permitting the members to move in a plane normal to the axis of rotation of the commutator to engage the same when the rotor reaches the predetermined speed, and electrical connections between the members comprising flexible conductors rigidly connected to the members.

3. In a dynamo electric machine the combination of a rotor having windings and a commutator, the commutator being provided with an internal contact face, a plurality of pivoted contact fingers having laterally overlapping arc-shaped contact faces of the same curvature as the internal contact face of the commutator, said fingers being normally held out of contact with the internal face of the commutator and engaging such face of the commutator when the rotor reaches the predetermined speed.

4. In a dynamo electric machine the combination of a rotor having a shaft, windings and a commutator, the commutator having an internal contact face, a sleeve fixed upon the shaft of the rotor and provided with a lateral flange, a plurality of contact members pivoted upon the flange and arranged to turn about axes substantially parallel to the axis of the rotor and springs for normally holding the fingers out of contact with the internal face of the commutator and permitting the fingers to move into engagement with such face of the commutator when the rotor reaches the predetermined speed.

5. In a dynamo electric machine the combination of a rotor having a shaft, windings and a commutator, the commutator having an internal contact face, an annular support on the shaft of the rotor and a plurality of contact fingers pivoted upon opposite sides of the support in staggered relation, the fingers being normally held out of engagement with the internal face of the commutator and being thrown into engagement with such face of the commutator when the rotor reaches the predetermined speed.

6. In a dynamo electric machine the combination of a rotor having windings and a commutator, the commutator being provided with an internal contact face, a plurality of pivoted arms provided with arc-shaped contact faces having the same curvature as the internal contact face of the commutator, means for supporting the arms in sets which are offset from one another axially of the rotor, the contact face of one arm of one set overlapping laterally the contact faces of arms of another set and means for normally holding the contact arms out of engagement with the internal face of the commutator and permitting the arms to engage such face of the commutator when the rotor reaches the predetermined speed.

7. A dynamo electric machine having, in combination, a rotor having windings and a commutator, the commutator being provided with an internal contact face, a plurality of contact fingers carried by the rotor and pivoted to turn about axes substantially parallel to the axis of the rotor and tension springs attached at each end to adjacent contact fingers and to exert their force substantially tangentially to the path of movement of the points of attachment for normally holding the contact fingers out of engagement with the internal contact face of the commutator and for permitting the fingers to engage such contact face of the commutator when the rotor reaches the predetermined speed.

8. In a dynamo electric machine the combination of a rotor having windings and a commutator, the commutator being provided with an internal contact face, a plurality of contact members for engaging such contact face of the commutator the members having three arms, one arm being provided with an arc-shaped portion at its extremity and having means for attaching a spring and a flexible conductor, a second arm provided with means for attaching a flexible conductor and a third arm provided with means for attaching a spring, and flexible conductors and springs connecting the members.

9. In a dynamo electric machine the combination of a rotor having windings and a commutator, the commutator being provided with an internal contact face, a plurality of contact fingers pivoted to turn upon axes substantially parallel to the axis of the rotor and engage the internal face of the commutator and tension springs connected at each end to a contact finger and tending to hold such contact fingers out of engagement with the commutator.

10. In a dynamo electric machine the combination of a rotor having windings and a commutator, a plurality of movable contact members, a plurality of springs each spring connected at its ends to different members and tending to hold the members out of engagement with the commutator and arranged to permit the members to engage the same when the rotor reaches the predetermined speed, and supplemental flexible electric conductors rigidly secured to and connecting the members.

11. In a dynamo electric machine the combination of a rotor having windings and a commutator, the commutator being provided with an internal contact face, a series of pivoted contact fingers movable in a plane normal to the axis of rotation of the commutator, and springs for holding the contact fingers out of engagement with the internal contact face, each spring having its ends connected to adjacent contact fingers.

CARL O. BERGSTROM.